US011481502B2

(12) United States Patent
Paluch et al.

(10) Patent No.: US 11,481,502 B2
(45) Date of Patent: Oct. 25, 2022

(54) TECHNOLOGY FOR ADAPTIVE SOFTWARE DISCOVERY SCAN (71) Applicant: International Business Machines Corporation, Armonk, NY (US)

(72) Inventors: Michal Paluch, Cracow (PL); Piotr P. Godowski, Cracow (PL); Andrzej Pietrzak, Podleze (PL); Szymon Kowalczyk, Cracow (PL); Tomasz Hanusiak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 16/791,558

(22) Filed: Feb. 14, 2020

(65) Prior Publication Data

US 2021/0256135 A1 Aug. 19, 2021

(51) Int. Cl.
*G06F 21/57* (2013.01)
*G06F 8/71* (2018.01)
*G06F 8/65* (2018.01)
*G06F 8/61* (2018.01)
*G06Q 10/10* (2012.01)

(52) U.S. Cl.
CPC .............. *G06F 21/577* (2013.01); *G06F 8/65* (2013.01); *G06F 8/71* (2013.01); *G06Q 10/109* (2013.01); *G06F 8/61* (2013.01); *G06F 2221/033* (2013.01)

(58) Field of Classification Search
CPC ..... G06F 8/65; G06F 8/71; G06F 8/61; G06F 21/577; G06F 2221/033; G06Q 10/109
See application file for complete search history.

(56) References Cited

U.S. PATENT DOCUMENTS

| 7,680,907 B2* | 3/2010 | Zarenin | G06F 11/3093 709/224 |
| 9,122,643 B2* | 9/2015 | Herz | G06F 11/1464 |
| 10,282,699 B2 | 5/2019 | Fabjanski | |
| 10,740,190 B2* | 8/2020 | Almog | G06F 9/45558 |

(Continued)

OTHER PUBLICATIONS

"Real-time scanning of software inventory," An IP.com Prior Art Database Technical Disclosure, IP.com No. IPCOM000225137DIP. com Electronic Publication Date: Jan. 25, 2013.

(Continued)

*Primary Examiner* — Douglas M Slachta
(74) *Attorney, Agent, or Firm* — Anthony V.S. England; Steven Bouknight; Susan M. Maze (57) ABSTRACT A first computer system is scanned at configured, default time intervals by a software asset management ("SAM") software application installed on the first computer system, wherein the scanning detects other software applications installed on the first computer system. The SAM software application generates a list of the other software applications installed on the first computer system and stores the list on a computer readable storage medium. An override software module triggers the SAM software application to perform an early scan of the first computer system, before a scan of the first computer system that the SAM software application would otherwise perform at a next default scan time. The triggering is in response to information obtained from a source external to the first computer system about a triggering one of the software applications on the list.

17 Claims, 5 Drawing Sheets (56) References Cited

U.S. PATENT DOCUMENTS

| | | | |
|---|---|---|---|
| 2006/0080656 A1* | 4/2006 | Cain | G06F 8/65 |
| | | | 434/118 |
| 2007/0136541 A1* | 6/2007 | Herz | G06F 11/1458 |
| | | | 714/E11.124 |
| 2007/0168715 A1* | 7/2007 | Herz | G06F 11/1461 |
| | | | 714/13 |
| 2009/0037481 A1* | 2/2009 | Baker | G06F 21/577 |
| 2010/0030776 A1* | 2/2010 | Panwar | G06Q 10/087 |
| | | | 707/E17.071 |
| 2012/0117234 A1* | 5/2012 | Miryanov | H04L 43/08 |
| | | | 709/224 |
| 2012/0174225 A1* | 7/2012 | Shyamsunder | G06F 21/56 |
| | | | 726/24 |
| 2014/0101061 A1* | 4/2014 | Boudreau | G06F 21/10 |
| | | | 705/317 |
| 2014/0324639 A1* | 10/2014 | Ruggeri | G06F 8/61 |
| | | | 705/28 |
| 2017/0078208 A1* | 3/2017 | Panin | H04L 47/24 |
| 2017/0178008 A1 | 6/2017 | Godowski | |
| 2017/0180204 A1* | 6/2017 | Ruggeri | H04L 67/306 |
| 2019/0220439 A1* | 7/2019 | Majka | G06F 16/152 |

OTHER PUBLICATIONS

"The NIST Definition of Cloud Computing," NIST Special Publication 800-145, National Institute of Standards and Technology, http://csrc.nist.gov/groups/SNS/cloud-computing/index.html, Sep. 28, 2011.

\* cited by examiner

TECHNOLOGY FOR ADAPTIVE SOFTWARE DISCOVERY SCAN

BACKGROUND

Within business enterprises, it is common for an enterprise to manage maintenance, updating, disposal, licensing, etc. of software applications across the enterprise, which may include running an inventory tool of a software asset management application on a regular, periodic schedule to scan the enterprise's computer network environment for detecting and collecting information about currently installed software of the enterprise. By obtaining an inventory of installed software via such scanning, the enterprise may better manage the software, which may include ensuring that the installed software is properly licensed and that no unauthorized software is installed, for example.

SUMMARY

In an embodiment of the present invention, a computer system implemented method for software inventory scanning includes scanning a first computer system at configured, default time intervals by a software asset management ("SAM") software application installed on the first computer system, wherein the scanning detects other software applications installed on the first computer system. The SAM software application generates a list of the other software applications installed on the first computer system, as detected by the SAM software application via the scanning, and stores the list on a computer readable storage medium. An override software module installed on a computer system triggers the SAM software application to perform an early scan of the first computer system, before a scan of the first computer system that the SAM software application would otherwise perform at a next default scan time, wherein the override software module triggers the early scan in response to information about a triggering one of the software applications on the list, wherein the override software module obtains the information about the triggering software application from a source external to the first computer system.

In one aspect, the override software module is installed on the first computer system. Alternatively, the override software module is installed on a second computer system.

In one aspect, the override software module triggers the early scan in response to information about more than one of the software applications on the list.

In one aspect, the information from the source external to the first computer system that is obtained by the override software module about the triggering software application includes information identifying a product ID, version and update of the triggering software application.

In one aspect, the information that the override software module obtains about the triggering software application from the source external to the first computer system includes a date applicable to the triggering software application, and the method includes computing, by the SAM software application after each regularly scheduled scan of the first computer system, a next scan time based on the default scan interval that has been configured for the first computer system. The computed next scan time is passed to the override module, wherein the override module triggers the early scan in response to comparing the next scan time to the date applicable to the triggering software application that the override software module obtained from the source external to the first computer system.

In other embodiments of the invention, other forms are provided, including a system and a computer program product.

BRIEF DESCRIPTION OF THE DRAWINGS

Features and advantages of the present invention will be more readily understood with reference to the attached figures and following description, wherein.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
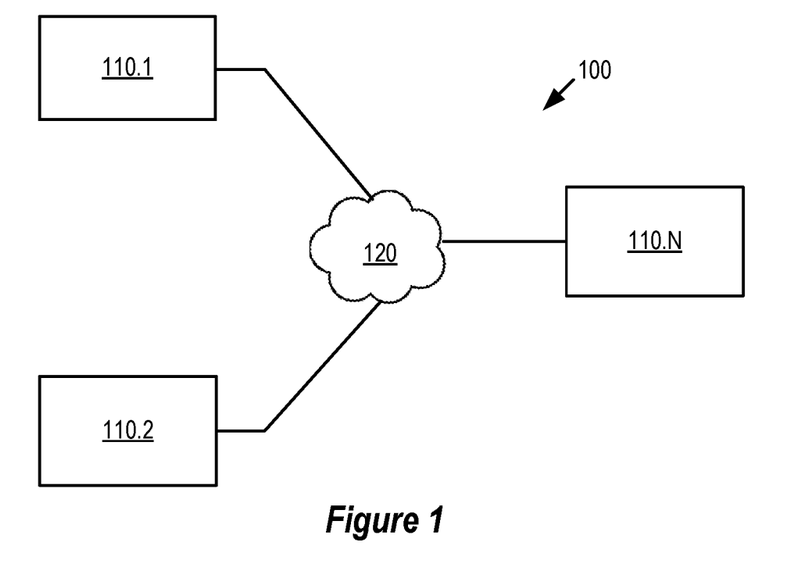
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be a public or private network. Systems 110.1, 110.2, etc. include modules, which may be program or hardware modules, configured to perform tasks for their own respective systems or for other systems or both, including tasks as described for elements of FIGS. 2 through 8 herein.

Figure 2:
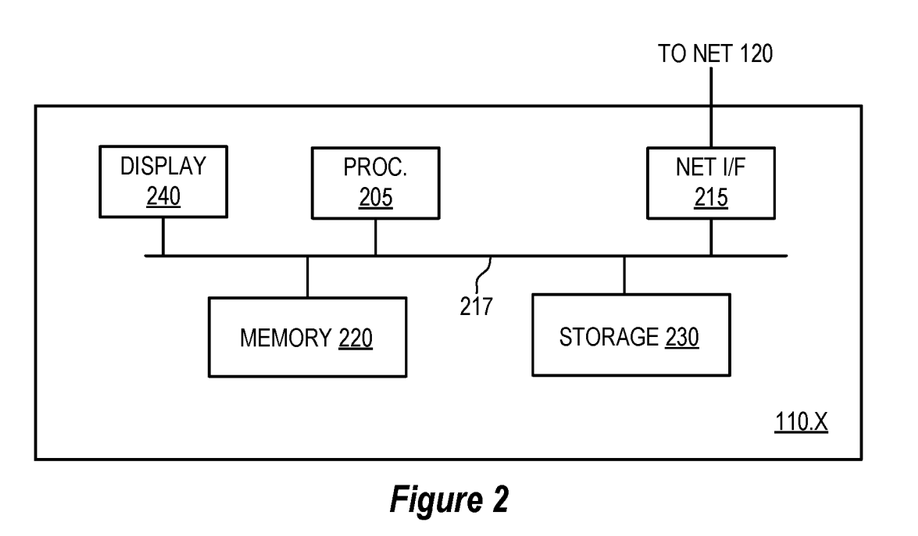
FIG. 2 is a block diagram of devices shown in FIG. 1, according to embodiments of the present invention.

FIG. 2 illustrates details of a computer system 110.X suitable as computer systems 110.1, 110.2, etc. according to embodiments of the present invention, wherein system 110.X includes at least one central processing unit (CPU) 205, network interface 215, interconnect (i.e., bus) 217, memory 220, storage device 230 and display 240. CPU 205 may retrieve and execute programming instructions stored in memory 220 for applications. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random-access memory, which includes data and program modules for run-time execution. It should be understood that system 110.X may be implemented by other hardware and that one or more modules thereof may be firmware.

The present invention, in its various embodiments, involves recognition by the inventors that there are downsides and tradeoffs to periodic software asset scanning of an enterprise network environment by software inventory tools running on computer systems in the environment. One downside concerns a potential time lag in detecting an unexpected software change in the environment, such as installation of an unauthorized software application. For example, if inventory scanning is monthly and a software change occurs immediately after the scanning—e.g., software has been installed, uninstalled, upgraded, patched, etc.—a time lag of almost thirty days may occur before the next scan detects the change. Likewise, there is a potential time lag in confirming that a desired software change has occurred, such as a software upgrade or patch, for example. This time lag may be reduced by setting the fixed scan frequency to a shorter time interval between scans, but this lower frequency results in higher scanning resource consumption on target disks and target computer systems (referred to herein as target "endpoints"). For example, each scan of registry and file systems of a target endpoint consumes resources of the endpoint. Based on the foregoing, it should be understood that there is a tradeoff between scan frequency and resource consumption for attaining quicker or slower software change detection.

Figure 3:
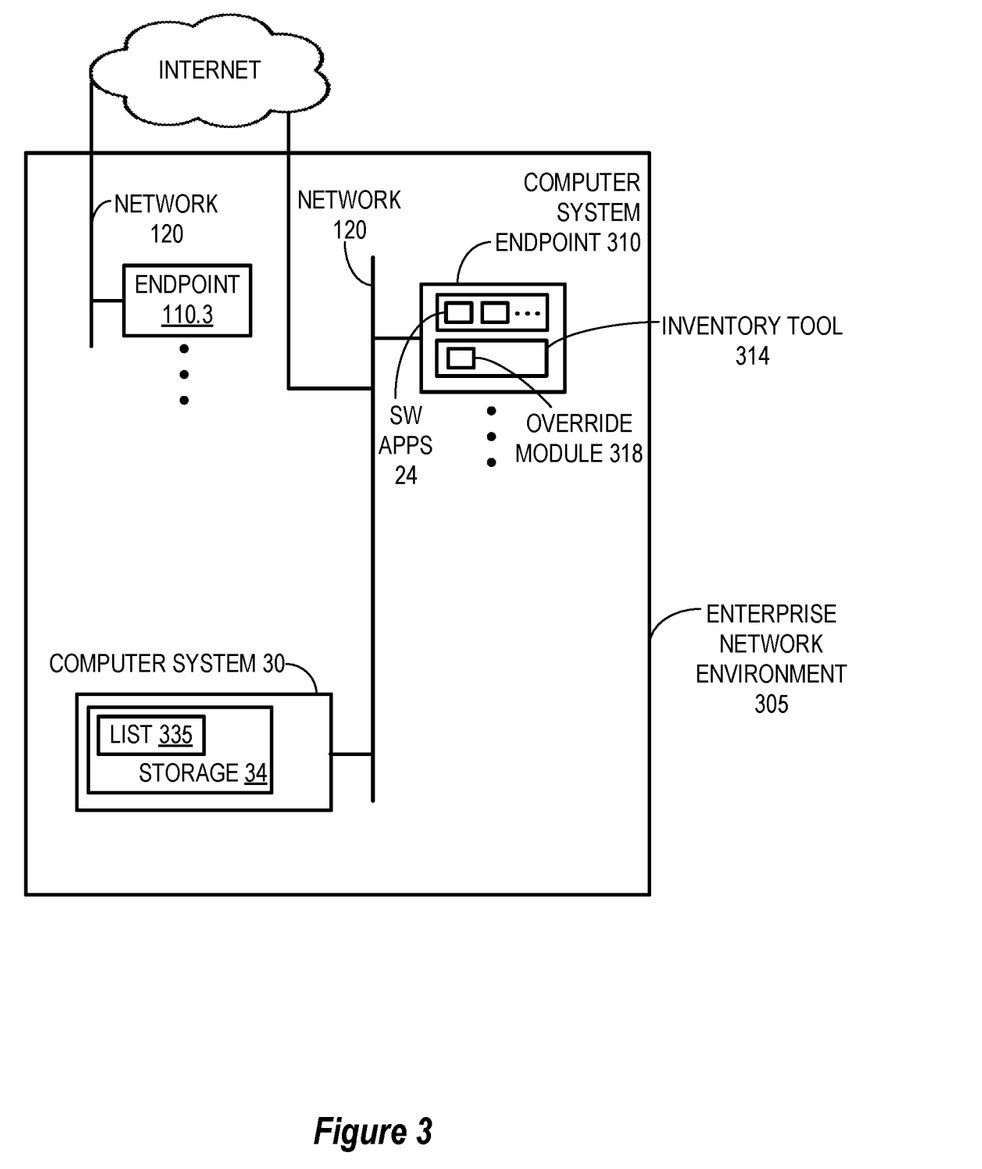
FIG. 3 illustrates a system for software asset management, according to embodiments of the present invention.

Referring now to FIG. 3, a system for software asset management is illustrated, according to embodiments of the present invention, wherein an instance of software asset management ("SAM") software application 315 is shown installed on a computer system 110.1 that is connected to network 120 in enterprise network environment 305. The illustrated SAM software application 315 includes a software inventory function and runs on its respective computer system 110.1 (which may also be referred to herein as an "endpoint") for scanning computer system 110.1 to detect and inventory other software applications 325 installed on computer system 110.1. (Although not explicitly shown, it should be understood that in an embodiment of the present invention other SAM applications 315 are installed on others of the computer systems 110.2, 110.3, 110.4, etc., whereas SAM application 315 on computer system 110.1 is explicitly shown and described herein as a representative example of the other SAM applications 315 on the other computer systems 110.2, 110.3, 110.4, etc.)

Enterprise network environment 305 has network-connected devices with software installed thereon, including physical computers and virtual machines.

The illustrated SAM app 315 on endpoint 110.1 is configured, such as by an administrator, for a set time interval between scans in an embodiment of the present invention. (Each SAM app 315 instance may be configured with its own respective scan time interval for its own respective endpoint 110.1, 110.2, 110.3, 110.4, etc.) The set time interval is a default that applies unless overridden and that determines regularly scheduled scans. The default time interval for SAM app 315 may be overridden automatically by override process 450. (Override process 450 for SAM application 315 of computer system 110.1 is shown as a new module of SAM application 315 in an embodiment of the present invention illustrated in FIG. 3, but it may be an independent software application or module of a software application in other embodiments. For example, override process 450 may be an independent software application or module of a software application installed on a server computer system—which could be, system 110.2, for example—in network environment 305.)

In certain situations, override process 450 automatically notifies SAM application 315 to scan earlier than a default scan that would otherwise next occur for the set time interval. That is, override process 450 invokes, i.e., triggers, an early scan based on certain information it detects, which it detects without consuming target endpoint resources or at least consuming only a little. In this way, an improved balance is attained in the tradeoff between target endpoint resource consumption versus software asset event detection lag, since detection lag is reduced automatically without decreasing the set time between software inventory scans of enterprise network environment 305.

To attain this improved balance, SAM application 315 inventories other software applications 325 on endpoint 110.1. That is, SAM application 315 generates list 335 of the other software applications 325 that its scan detects and stores list 335 on a computer readable storage medium accessible to override process 450, which override process 450 may then use as described herein below. (In the illustrated embodiment, SAM application 315 stores list 335 on storage medium 330 of a second computer system 110.2 in the network environment 305, which may be a service system, for example. However, in another embodiment, SAM application 315 may store list 335 on a storage medium of the same computer system 110.1 that SAM application 315 scans and on which it is installed.) In an embodiment of the present invention, information included on list 335 for the other software applications 325 may identify the filename, product ID, size, date, path, and version of each application 325, for example.

After each regularly scheduled scan for its endpoint 110.1, SAM application 315 computes a next scan time based on the default scan interval that has been configured for the endpoint 110.1 and passes the next scan time to override process 450, so that override process 450 may use the next scan time as a factor in determining whether to invoke an early scan. More specifically, for determining whether to invoke an early scan, override process 450 reads inventory list 335 and searches external sources, such as on internet 340 (i.e., sources other than enterprise network environment 305 endpoints 110.1, 110.2, 110.3, 110.4, etc.) for information about software applications 325 of list 335. (External sources include websites of software providers, public Common Vulnerability and Exposures databases, which are currently managed by the Mitre Corporation, and public end of support and end of life databases, such as published by software providers and by others such as the Center for Internet Security, for example.) In particular, override process 450 searches sources for externally determined information about each software application 325 that is on inventory list 335, such externally determined information including currently available versions, releases and fix packs and including notices of newly detected security vulnerabilities and of dates of upcoming new versions, releases, fix packs and end of support. (Herein, the term "fix pack" includes fixes such as patches and program temporary fixes and include single bug fixes and groups of fixes. Consequently, the terms "fix pack," "patch" and "program temporary fix" may be used interchangeably herein.)

Once override process 450 has completed an instance of searching sources for external information about software 325 on list 335, override process 450 compares the next scan time it received from SAM application 315 to dates it found externally for respective software applications of list 335—e.g., dates for recently available versions, releases, fix packs and security vulnerabilities and dates for upcoming versions, releases, fix packs, end of support and end of life. In one embodiment, override process 450 determines if any such externally determined date occurs after the last scan that was performed for system 110.1 and before the next scheduled scan time that SAM application 315 has determined for the system 110.1. If so, override process 450 triggers an early scan, i.e., notifies SAM application 315 to scan endpoint 110.1 at a certain time after the indicated date it found externally, where the predetermined time is a sufficient interval of time after the indicated date such that the version, release or fix pack should have been installed by then, such as, for example, an interval of three days. The early scanning is to detect whether the version, release or fix pack has been timely installed.

For another instance, in the search by override process 450 of external information for software applications that list 335 indicates were installed on system 110.1 at the time of the last scan, the search reveals end of support has occurred in the past for a particular one of the listed 335 applications. Consequently, i.e., in response, override process 450 triggers an early scan to determine whether the particular application has now been de-installed. Override process 450 then compares the list 335 of applications generated by the early scan, and in response to the comparison indicating that the application has not been de-installed, SAM override process 450 causes a notification to be sent to the user of system 110.1 and to an administrator, where the notification identifies: the system 110.1, the date of the early scan, the date that end of support occurred, the external source for the end of support date, and the affected application that has not been de-installed.

For another instance, in the search by override process 450 of external information for software applications that list 335 indicates were installed on system 110.1 at the time of the last scan, the search reveals an external announcement of a vulnerability for a particular one of the listed 335 applications, where the announcement indicates no software patch is yet available for the vulnerability. Consequently, rather than triggering an early scan, override process 450 immediately notifies the user of system 110.1 and an administrator that the announced vulnerability exists with no available patch, where the notice identifies the system 110.1, the source of the announcement, and the affected application, so that the user or administrator may isolate system 110.1 from the network. Alternatively, override process automatically isolates system 110.1 from the network immediately.

In addition to actions such as triggering an early scan, notifying and isolating as described herein above, each override process 450 is configured, in an embodiment of the present invention, to also trigger scans of its endpoint 110.1 at a higher frequency than that of the default time interval—i.e., a shorter time interval than the default time interval—until an issue revealed by scanning for the endpoint 110.1 has been resolved, regardless of whether the scan was a regularly scheduled scan or was a scan invoked early by override process 450. (The shorter time interval is configurable, so that the administrator may set a predetermined, short time interval.) For example, if the administrator has set the regular scan time interval for an SAM application 315 to one month and has set a shorter time interval to five days, and if analysis by override process 450 detected that a fix pack has become available and is not yet installed on endpoint 110.1, then override process 450 will continue to invoke scans every five days until the fix pack is installed on the endpoint 110.1. In an embodiment of the present invention, SAM application 315 is configured such that once an issue that was detected by a scan has been resolved, SAM application 315 reverts back to its default scan time interval. With the above described arrangement, the scan schedule are more frequent only for those endpoints 110.1, 110.2, 110.3, 110.4, that have unresolved issues, etc., while the rest of environment 305 remains unaffected. This ensures that overall environment 305 resource consumption is lower, while potentially affected endpoints 110.1, 110.2, 110.3, 110.4, etc. are scanned more frequently.

Figure 4:
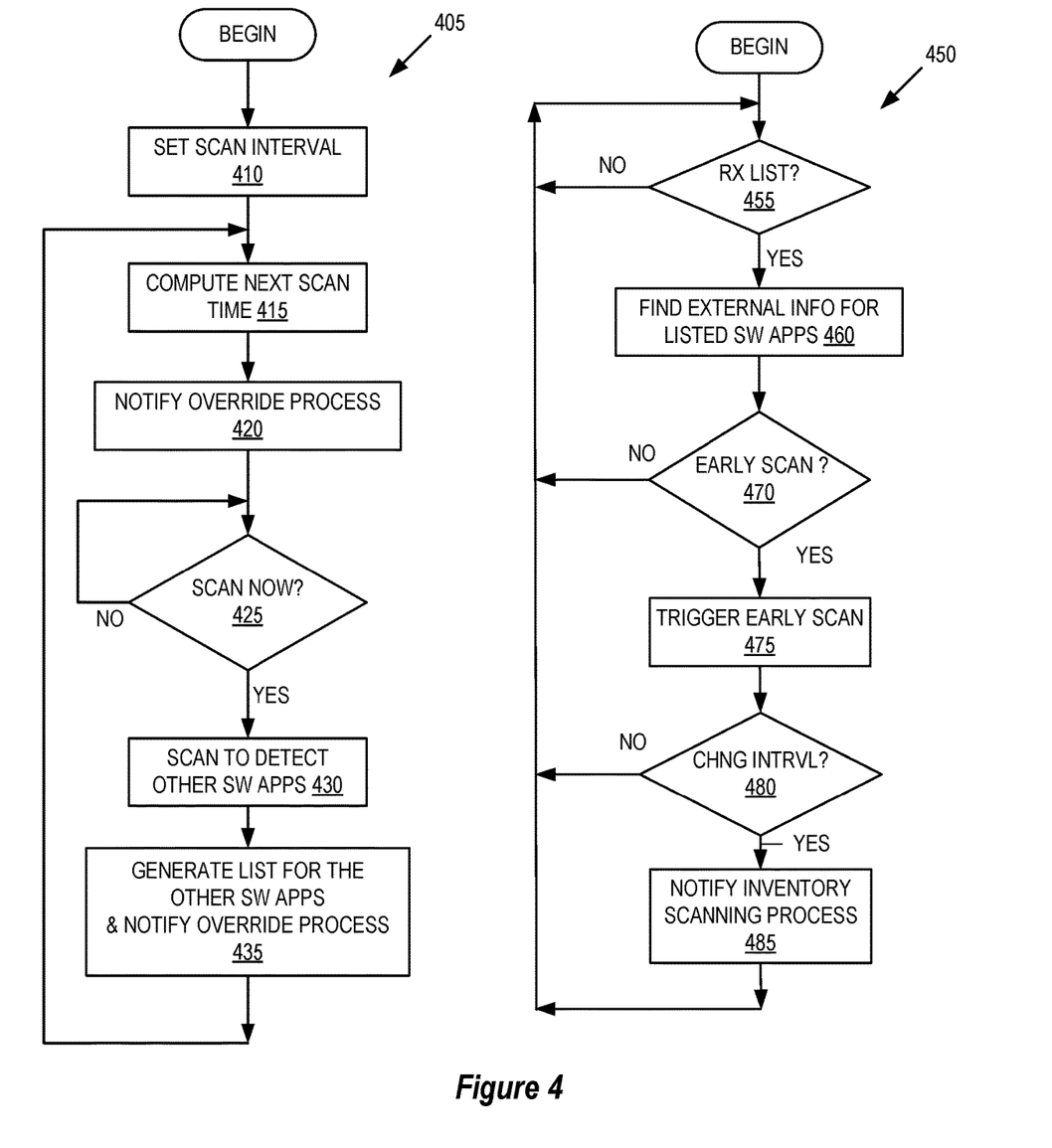
FIG. 4 illustrates a computer system implemented method for software inventory scanning via flow charts for a software inventory process and an override process 450, according to an embodiment of the present invention.

Referring now to FIG. 4, a computer system implemented method for software inventory scanning is shown via flow charts for a software inventory process 405 and an override process 450, according to an embodiments of the present invention. At 410 in process 405, a default interval is initially configured for scanning a first computer system at set time intervals by a SAM software application installed on the first computer system. For the set interval, process 405 computes a next scan time at 415 and at 420 notifies override process 420 of the time when the next scan will occur. At 425, process 405 waits until the next scan time or else notification from process 450 that an early can should be performed. At 430, process 405 scans for, and thereby detects, other software applications installed on the first computer system. (Likewise, a second computer system is scanned at configured, default time intervals by a SAM software application installed on the second computer system, which detects other software applications installed on the second computer system, and so on for third computer system, fourth computer system and so on. The following describes the method for the first computer system, but it should be understood that similar configurations and actions apply for the second computer system, third computer system, etc.)

At 435, process 405 of the SAM software application on the first computer system generates a list of the other software applications installed on the first computer system, i.e., a software inventory list, as detected by the SAM software application via the scanning. The SAM software application may determine information identifying a product ID, version and update for each of the other software applications installed on the first computer system, for example, as well as other information, and, correspondingly includes this information as part of the list. (See earlier description in connection with FIG. 3 herein above for other examples of other relevant information that SAM software application may put on the inventory list.) Correspondingly, at 435 the SAM software application notifies override process 450 of the new scan and associated update to the list of applications on the first computer system and stores the list on a computer readable storage medium, which may be installed on the first computer system, or it may be installed elsewhere, such as on a server computer system.

After each regularly scheduled scan 430 of the first computer system, list generating, etc. 435, process 405 of the SAM software application returns again to 415 at which point it computes a next scan time based on the current scan interval for the first computer system and passes the computed next scan time to the override module. The current interval may be the initially configured default scan interval or a new one such as determined by override process 450 as described herein below.

Override process 450 waits at 455 for notice of the latest list, which process 455 uses for determining whether to invoke an early scan. Upon receipt at 455, process 450 reads the software inventory list, searches the external sources, and responsively finds, at 460, external information about the software applications of the inventory list, such as information identifying a product ID, version and update for each of the software applications of the inventory list. (See earlier description herein above in connection with FIG. 3 for other examples of information about software applications on the lists. The override module finds such information on external sources for each of the software applications of the inventory list.) For each software application on the inventory list, override process 450 compares at 470 the information it found on the external sources to the corresponding inventory list information.

In one instance of operation, for example, the information that the override software module obtains about a triggering software application from the source external to the first computer system includes a date applicable to the triggering software application, such as date of announced end of support, announced software vulnerability, date of software release of fix pack availability, etc. The override module compares the next scan time to the date applicable to the triggering software application that the override software module obtained from the source external to the first computer system and may trigger the early scan in response to the comparing, i.e., when the comparison indicates a reason for an early scan.

That is, more specifically, once override process 450 has completed an instance of searching 460 sources for external information about software on the inventory list, override process 450 compares 470 the next scan time received from process 405 (at 320) to dates that process 450 found externally for respective software applications of list—e.g., dates of recent versions, releases, fix packs and security vulnerabilities and dates for upcoming versions, releases, fix packs, end of support and end of life—and determines 470 if any such external date occurs after the last scan and before the next scheduled scan time. If yes, at 470, override process 450 triggers 475 an early scan, i.e., notifies process 405 (325 yes) to scan the first computer system at a predetermined time interval after the indicated date process 450 found externally at 460, where the predetermined time interval is a sufficient amount of time after the indicated date such that the version, release or fix pack should have been installed by then, such as, for example, three days. This amount of time may be configured by an administrator, for example.

In another aspect for embodiments of the present invention, in addition to invoking an early scan each override process 450 is configured to also trigger scans of its endpoint 110.1 at a frequency that is higher than that of the default time interval—i.e., a shorter time interval than the default time interval—until the cause of a scan for the endpoint 110.1 has been resolved, regardless of whether the scan was a regularly scheduled scan or was a scan triggered early by override process 450. (The shorter time interval is configurable, so that the administrator may set a predetermined, short time interval.) For example, if the administrator has set the regular scan time interval for an SAM application 315 to one month and has set a shorter time interval to five days, and if analysis by override process 450 detected that a fix pack has become available and is not yet installed on endpoint 110.1, then override process 450 will continue to invoke scans every five days until the fix pack is installed on the endpoint 110.1. In an embodiment of the present invention, SAM application 315 is configured such that once an issue that was detected by a scan has been resolved, SAM application 315 reverts back to its default scan time interval.

It is to be understood that although this disclosure includes the following detailed description of cloud computing, implementation of the teachings recited herein are not limited to a cloud computing environment. Rather, embodiments of the present invention are capable of being implemented in conjunction with any other type of computing environment now known or later developed.

A cloud computing model of service delivery may include at least five characteristics, at least three service models, and at least four deployment models.

Characteristics for a cloud computing model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models for cloud computing are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models for cloud computing are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling computing resources.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
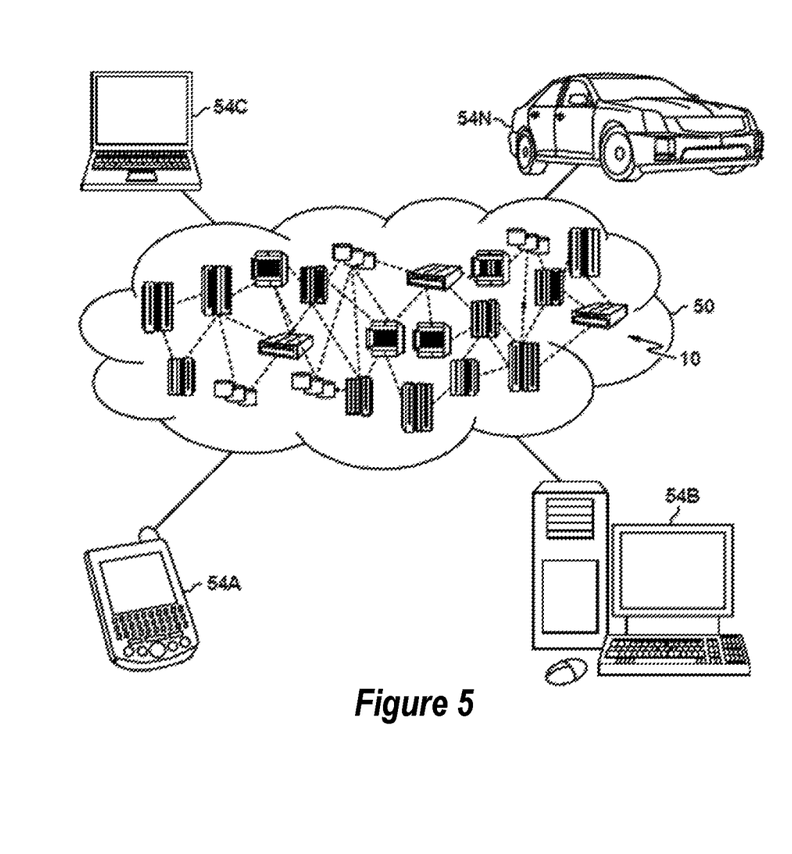
FIG. 5 depicts a cloud type of computing resource environment, according to embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
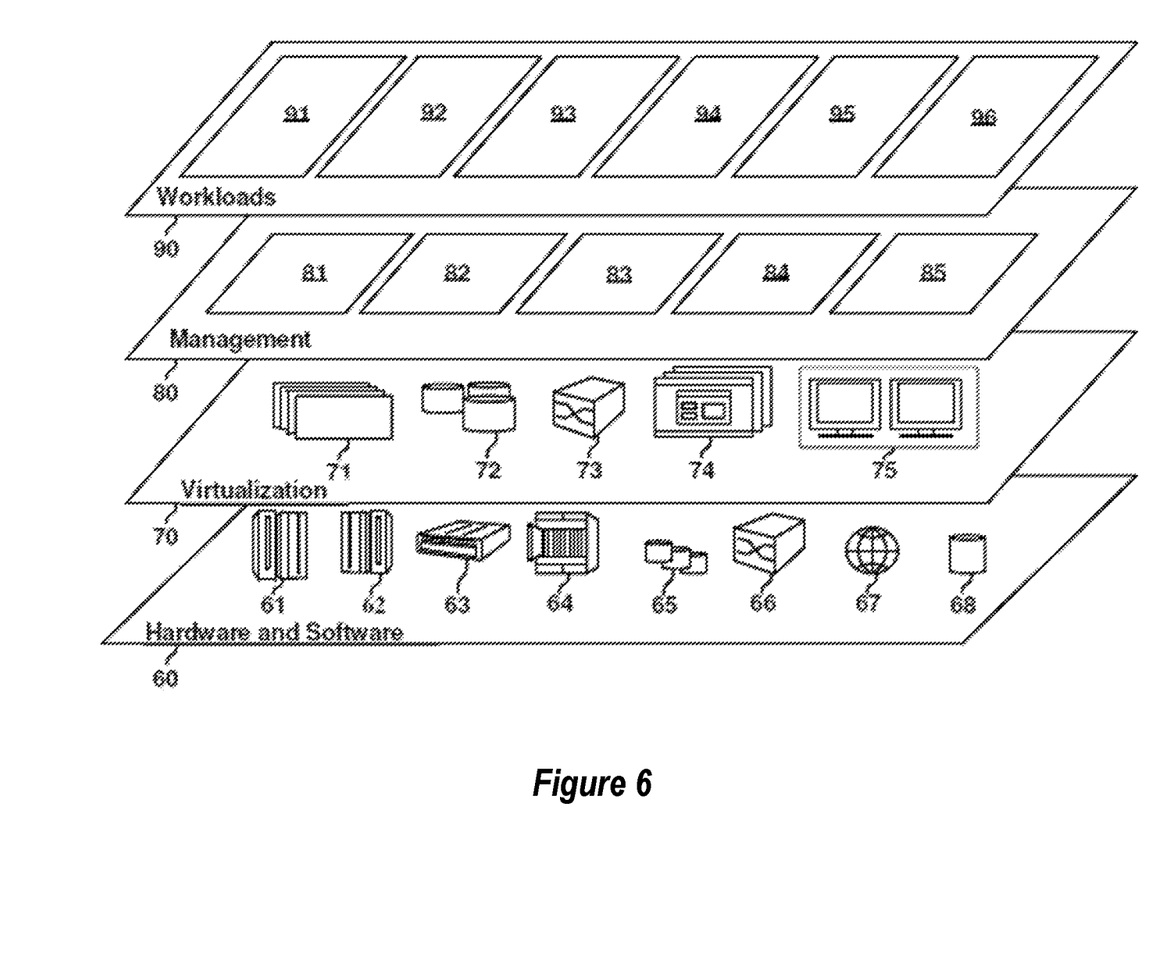
FIG. 6 depicts abstraction model layers applicable to a cloud type of computing resource model, according to embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91, software development and lifecycle management 92, virtual classroom education delivery 93, data analytics processing 94, transaction processing 95, and providing computing resources to a user 96. One or more of these workloads may include workloads for software asset management as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Likewise, the actions recited in the claims can be performed in a different order and still achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A computer system implemented method for software inventory scanning, the method comprising:
   scanning a first computer system at configured, default time intervals by a software asset management ("SAM") software application installed on the first computer system, wherein the scanning detects other software applications installed on the first computer system;
   generating, by the SAM software application, a list of the other software applications installed on the first computer system, as detected by the SAM software application via the scanning, and storing the list on a computer readable storage medium;
   triggering, by an override software module installed on a computer system, the SAM software application to perform an early scan of the first computer system, before a scan of the first computer system that the SAM software application would otherwise perform at a next default scan time, wherein the override software module triggers the early scan in response to information about a triggering one of the software applications on the list, wherein the override software module obtains the information about the triggering software application from a source external to the first computer system, and wherein the information that the override software module obtains about the triggering software application from the source external to the first computer system includes a date applicable to the triggering software application, and the method includes:
   computing, by the SAM software application after each regularly scheduled scan of the first computer system, a next scan time based on the default scan interval that has been configured for the first computer system; and
   passing the computed next scan time to the override module, wherein he override module triggers the early scan in response to comparing the next scan time to the date applicable to the triggering software application that the override software module obtained from the source external to the first computer system.

2. The method of claim 1, wherein the override software module is installed on the first computer system.

3. The method of claim 1, wherein the override software module is installed on a second computer system.

4. The method of claim 1, wherein the override software module triggers the early scan in response to information about more than one of the software applications on the list.

5. The method of claim 1, wherein the information from the source external to the first computer system that is obtained by the override software module about the triggering software application includes information identifying a product ID, version and update of the triggering software application.

6. The method of claim 1 comprising:
   triggering isolation of the first computer system in response to announcement from the external source that one of the software applications on the list has a vulnerability and that no fix pack has been released.

7. A system for software inventory scanning comprising:
a processor; and
a computer readable storage medium connected to the processor, wherein the computer readable storage medium has stored thereon a program for controlling the processor, and wherein the processor is operative with the program to execute the program for:
scanning a first computer system at configured, default time intervals by a software asset management ("SAM") software application installed on the first computer system, wherein the scanning detects other software applications installed on the first computer system;
generating, by the SAM software application, a list of the other software applications installed on the first computer system, as detected by the SAM software application via the scanning, and storing the list on a computer readable storage medium;
triggering, by an override software module installed on a computer system, the SAM software application to perform an early scan of the first computer system, before a scan of the first computer system that the SAM software application would otherwise perform at a next default scan time, wherein the override software module triggers the early scan in response to information about a triggering one of the software applications on the list, wherein the override software module obtains the information about the triggering software application from a source external to the first computer system, and wherein the information that the override software module obtains about the triggering software application from the source external to the first computer system includes a date applicable to the triggering software application, and the method includes:
computing, by the SAM software application after each regularly scheduled scan of the first computer system, a next scan time based on the default scan interval that has been configured for the first computer system; and
passing the computed next scan time to the override module, wherein he override module triggers the early scan in response to comparing the next scan time to the date applicable to the triggering software application that the override software module obtained from the source external to the first computer system.

8. The system of claim 7, wherein the override software module is installed on the first computer system.

9. The system of claim 7, wherein the override software module is installed on a second computer system.

10. The system of claim 9, wherein the override software module triggers the early scan in response to information about more than one of the software applications on the list.

11. The system of claim 7, wherein the information from the source external to the first computer system that is obtained by the override software module about the triggering software application includes information identifying a product ID, version and update of the triggering software application.

12. The system of claim 7, wherein the processor is operative with the program to execute the program for:
triggering isolation of the first computer system in response to announcement from the external source that one of the software applications on the list has a vulnerability and that no fix pack has been released.

13. A computer program product for software inventory scanning, including a computer readable storage medium having instructions stored thereon for execution by a computer system, wherein the instructions, when executed by the computer system, cause the computer system to implement a method comprising:
scanning a first computer system at configured, default time intervals by a software asset management ("SAM") software application installed on the first computer system, wherein the scanning detects other software applications installed on the first computer system;
generating, by the SAM software application, a list of the other software applications installed on the first computer system, as detected by the SAM software application via the scanning, and storing the list on a computer readable storage medium;
triggering, by an override software module installed on a computer system, the SAM software application to perform an early scan of the first computer system, before a scan of the first computer system that the SAM software application would otherwise perform at a next default scan time, wherein the override software module triggers the early scan in response to information about a triggering one of the software applications on the list, wherein the override software module obtains the information about the triggering software application from a source external to the first computer system, and wherein the information that the override software module obtains about the triggering software application from the source external to the first computer system includes a date applicable to the triggering software application, and the method includes:
computing, by the SAM software application after each regularly scheduled scan of the first computer system, a next scan time based on the default scan interval that has been configured for the first computer system; and
passing the computed next scan time to the override module, wherein he override module triggers the early scan in response to comparing the next scan time to the date applicable to the triggering software application that the override software module obtained from the source external to the first computer system.

14. The computer program product of claim 13, wherein the override software module is installed on the first computer system.

15. The computer program product of claim 13, wherein the override software module is installed on a second computer system.

16. The computer program product of claim 13, wherein the override software module triggers the early scan in response to information about more than one of the software applications on the list.

17. The computer program product of claim 13, wherein the information from the source external to the first computer system that is obtained by the override software module about the triggering software application includes information identifying a product ID, version and update of the triggering software application.

* * * * *